US010462738B1

(12) United States Patent
Leyh et al.

(10) Patent No.: US 10,462,738 B1
(45) Date of Patent: Oct. 29, 2019

(54) BASE STATION DEVICE WITH REDUCED POWER CONSUMPTION AND METHOD THEREOF

(71) Applicant: MOTOROLA SOLUTIONS, INC., Chicago, IL (US)

(72) Inventors: Arthur Christopher Leyh, Spring Grove, IL (US); Thomas B. Bohn, McHenry, IL (US); Gregory J. Buchwald, Crystal Lake, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/044,261

(22) Filed: Jul. 24, 2018

(51) Int. Cl.
*H04W 52/02* (2009.01)
*H04W 56/00* (2009.01)
*H04W 72/04* (2009.01)
*H04B 7/212* (2006.01)

(52) U.S. Cl.
CPC ..... *H04W 52/0206* (2013.01); *H04W 56/001* (2013.01); *H04W 72/0446* (2013.01); *H04B 7/212* (2013.01)

(58) Field of Classification Search
None
See application file for complete search history.

(56) References Cited

U.S. PATENT DOCUMENTS

| 4,509,199 | A | 4/1985 | Ichihara |
|---|---|---|---|
| 4,577,315 | A | 3/1986 | Otsuka |
| 4,964,121 | A | 10/1990 | Moore |
| 5,265,270 | A | 11/1993 | Stengel et al. |
| 5,584,048 | A | 12/1996 | Wieczorek |
| 5,999,830 | A | 12/1999 | Taniguchi et al. |
| 6,463,050 | B1 | 10/2002 | Nagashima |
| 6,584,330 | B1 | 6/2003 | Ruuska |
| 7,701,911 | B2 | 4/2010 | Soliman |
| 8,023,924 | B2 | 9/2011 | Kim et al. |
| 8,892,176 | B2 | 11/2014 | Kim et al. |
| 2010/0189023 | A1 | 7/2010 | Lindgren et al. |
| 2011/0122803 | A1 | 5/2011 | Ahn |
| 2012/0224607 | A1* | 9/2012 | Sun ............... H04B 1/7156 375/133 |

(Continued)

FOREIGN PATENT DOCUMENTS

EP 2824975 1/2015

*Primary Examiner* — Christine T Duong
(74) *Attorney, Agent, or Firm* — Michael Best & Friedrich LLP

(57) ABSTRACT

Base station device with reduced power consumption and method thereof. The base station device includes a transmitter configured to implement time-division multiple access (TDMA). The transmitter transmits payload signals in a TDMA frame including a first timeslot and a second timeslot, with one of the first timeslot and the second timeslot designated as an active timeslot and the other of the first timeslot and the second timeslot designated as an idle timeslot. The base station device includes an electronic processor coupled to the transmitter and configured to control transmission of calls through the transmitter. The electronic processor is configured to transmit payload signals during the active timeslot and de-key the transmitter during the idle timeslot. During a voice call, the electronic processor is configured to re-kay the transmitter during a portion of the idle timeslot to transmit synchronization information.

20 Claims, 5 Drawing Sheets

(56) References Cited

U.S. PATENT DOCUMENTS

2013/0170413 A1* 7/2013 Chow ................. H04W 52/028
                                                                                                       370/311
2018/0220396 A1* 8/2018 Xu ....................... H04W 72/12

\* cited by examiner

BASE STATION DEVICE WITH REDUCED POWER CONSUMPTION AND METHOD THEREOF

BACKGROUND OF THE INVENTION

Mobile communication devices (for example, smart telephones, portable radios, and the like) communicate with each other via base station devices. Base station devices facilitate voice calls and data calls from a mobile communication device to a server or a second mobile communication device. Network providers rent space in tower sites to place the base station devices. The base station devices may be powered by limited capacity power sources (for example, solar cells, batteries, and the like).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
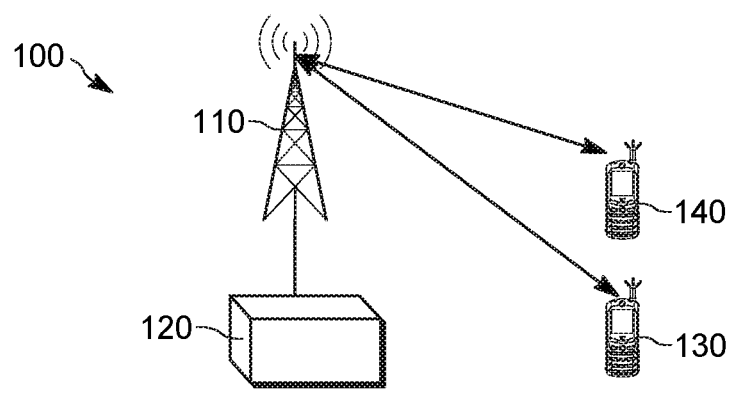
FIG. 1 illustrates a digital mobile radio system including a base station device and a mobile communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

For network providers, one of the major costs in implementing the base station devices is the energy used by the base station devices. For example, rent at tower sites is based on size and energy usage. Additionally, the power source may have limited capacity and may need to be recharged or replaced periodically based on energy usage of the base station devices.

Accordingly, there is a need for improving the energy efficiency of the base station devices to provide additional cost savings for a network provider.

One embodiment provides a base station device with reduced power consumption including a transmitter configured to implement time-division multiple access (TDMA). The transmitter transmits payload signals in a TDMA frame including a first timeslot and a second timeslot, where one of the first timeslot and the second timeslot is designated as an active timeslot and the other of the first timeslot and the second timeslot is designated as an idle timeslot. The base station device also includes an electronic processor coupled to the transmitter and configured to control transmission of calls through the transmitter. The electronic processor is configured to determine whether a current active transmission of the base station device is a voice transmission or a data transmission. In response to determining that the current active transmission is the voice transmission, the electronic processor is configured to transmit, via the transmitter, voice payload in the active timeslot of the TDMA frame and transmit, via the transmitter, control data between the active timeslot and the idle timeslot of the TDMA frame. The electronic processor is further configured to de-key the transmitter during a first portion of the idle timeslot, re-key the transmitter during a second portion of the idle timeslot, and de-key the transmitter during a third portion of the idle timeslot. In response to determining that the current active transmission is the data transmission, the electronic processor is configured to transmit, via the transmitter, data payload in the active timeslot of the TDMA frame and transmit, via the transmitter, control data between the active timeslot and the idle timeslot of the TDMA frame. The electronic processor is further configured to de-key the transmitter for the idle timeslot of the TDMA frame.

Another embodiment provides a method for reducing power consumption of a base station device. The base station device includes a transmitter configured to implement time-division multiple access (TDMA). The transmitter transmits payload signals in a TDMA frame including a first timeslot and a second timeslot. One of the first timeslot and the second timeslot is designated as an active timeslot and the other of the first timeslot and the second timeslot is designated as an idle timeslot. The method includes determining, using an electronic processor of the base station device, whether a current active transmission of the base station device is a voice transmission or a data transmission. In response to determining that the current active transmission is the voice transmission, the method includes transmitting, via the transmitter, voice payload in the active timeslot of the TDMA frame and transmitting, via the transmitter, control data between the active timeslot and the idle timeslot of the TDMA frame. The method also includes de-keying, using the electronic processor, the transmitter during a first portion of the idle timeslot, re-keying, using the electronic processor, the transmitter during a second portion of the idle timeslot and transmit, via the transmitter, sync information, and de-keying, using the electronic processor the transmitter during a third portion of the idle timeslot. In response to determining that the current active transmission is the data transmission, the method includes transmitting, via the transmitter, data payload in the active timeslot of the TDMA frame and transmitting, via the transmitter, control data between the active timeslot and the idle timeslot of the TDMA frame. The method further includes de-keying, using the electronic processor, the transmitter for the idle timeslot of the TDMA frame.

FIG. 1 illustrates a digital mobile radio system 100 including a base station device 110 connected to a power source 120 and mobile communication devices 130 and 140. The base station device 110 is, for example, a digital mobile radio (DMR) base station, a project 25 (P25) base station, a terrestrial trunked radio (TETRA) base station, a base station repeater, and the like. Below, the functionality of the system is described with respect to a digital mobile radio (DMR) network, however, one or ordinary skill in the art would recognize that the functionality is also applicable to P25 and TETRA systems. The power source 120 is, for example, a wall outlet. In some cases, the wall outlet may be connected to a power grid. However, in other case, the wall outlet is connected to a capacity-limited alternative power source (for example, solar cells), a battery, and the like. The mobile communication device 130 is, for example, a two-way radio, a smart telephone, a tablet computer, a laptop computer, a vehicle-mounted radio, a drone-mounted radio, a modem, a relay, and the like. Mobile communication devices 130 and 140 communicate with each other via voice and data communications sent to one another via the base station device 110.

Figure 2:
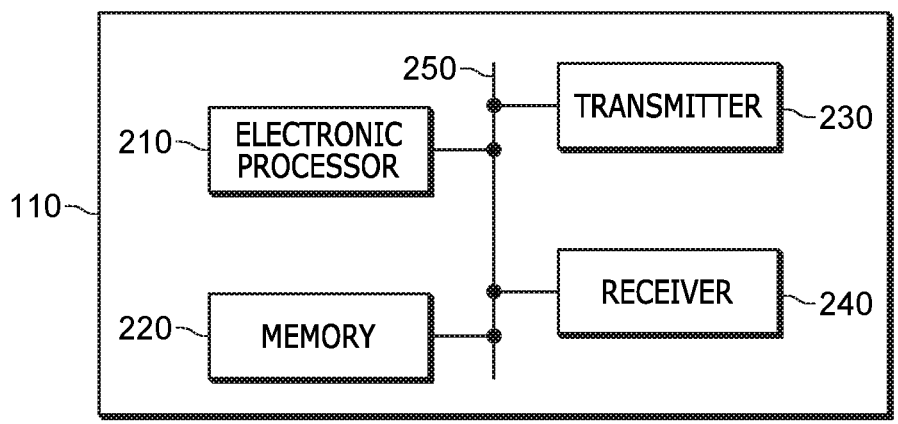
FIG. 2 is a block diagram of the base station device of FIG. 1 in accordance with some embodiments.

FIG. 2 is a simplified block diagram of the base station device 110. In the example illustrated, the base station device 110 includes an electronic processor 210, a memory 220, a transmitter 230, and a receiver 240. The electronic processor 210, the memory 220, the transmitter 230, and the receiver 240 communicate over one or more control and/or data buses (for example, a communication bus 250). The base station device 110 may include more or fewer components than those illustrated in FIG. 2. In some embodiments, the electronic processor 210 is implemented as a microprocessor with separate memory, for example, the memory 220. In other embodiments, the electronic processor 210 is implemented as a microcontroller or digital signal processor (with memory 220 on the same chip). In other embodiments, the electronic processor 210 is implemented using multiple processors. In addition, the electronic processor 210 may be implemented partially or entirely as, for example, a field-programmable gate array (FPGA), an application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the base station device 110 described herein. The memory 220 may include, for example, a program storage area and a data storage area. The program storage area and the data storage area may include combinations of different types of memory, for example, read-only memory and random-access memory.

The transmitter 230 and the receiver 240 enable wireless communication between the base station device 110 and external networks (for example, digital mobile network, cellular network, or the like) and between the base station device 110 and the mobile communication devices 130 and 140. In some embodiments, rather than a separate transmitter 230 and receiver 240, the base station device 110 may include a transceiver.

In one example, the digital mobile radio system 100 employs a Time Division Multiple Access (TDMA) technology with a 2-slot TDMA solution and RF carrier bandwidth of 12.5 kHz to employ voice and data communications between the mobile communication devices 130 and 140. In other examples, the digital mobile radio system 100 may employ TDMA technology with more than 2 -slots (for example, 4 -slot TDMA solution for a TETRA network). The physical resource available to the digital mobile radio system 100 is an allocation of the radio spectrum. The radio spectrum allocation is partitioned into Radio Frequency (RF) carriers with each RF carrier partitioned in time into frames, referred to as the TDMA frames, and timeslots. The base station device 110 transmitter 230 transmits data streams using the TDMA frame 300 shown in FIG. 3A. A digital mobile radio burst is a period of RF carrier that is modulated by the data stream.

Figure 3A:
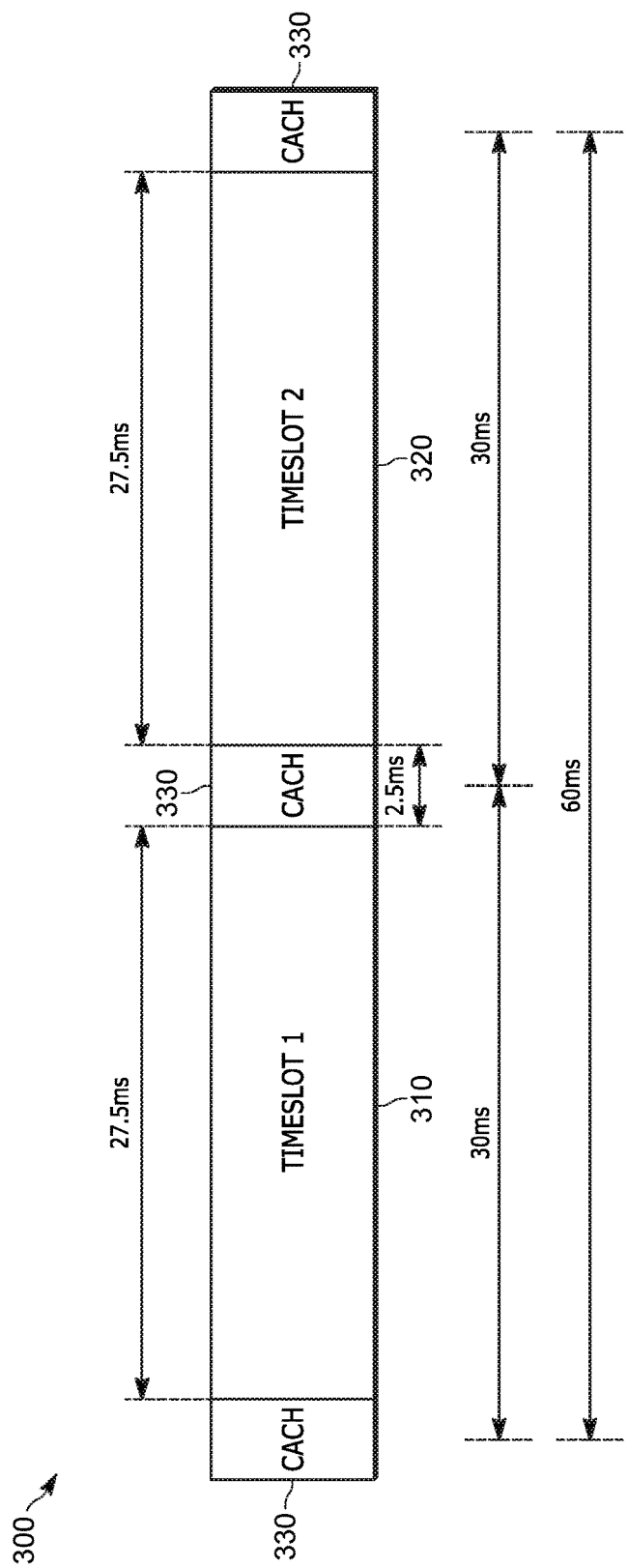
FIG. 3A illustrates a time-division multiple access (TDMA) frame in accordance with some embodiments.
Figure 3B:
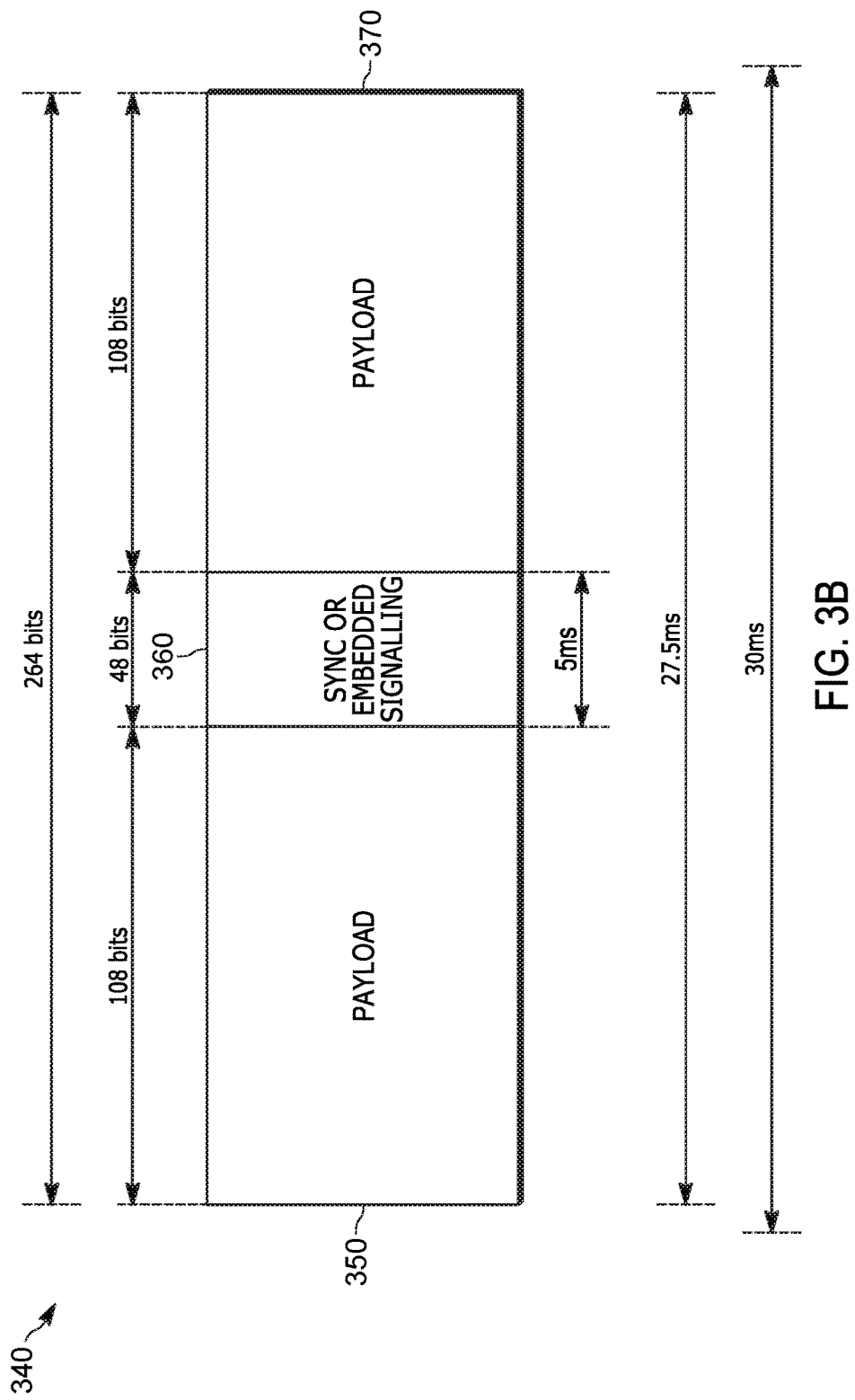
FIG. 3B illustrates a digital mobile radio burst transmitted during a timeslot of the TDMA frame of FIG. 3A in accordance with some embodiments.

Referring to FIG. 3A, the TDMA frame 300 includes a first timeslot 310, a second timeslot 320, and common announcement channels (CACH) 330. Each TDMA frame 300 is 60 milliseconds long, with each timeslot 310 and 320 being 27.5 milliseconds long. Each timeslot 310 and 320 carries one digital mobile radio burst. FIG. 3B illustrates a single digital mobile radio burst 340 as carried by each timeslot 310 and 320. The burst 340 includes a first portion 350, a second portion 360, and a third portion 370. The first portion 350 and the third portion 370 carry 108-bit payload fields. Payload includes the actual voice or data signals transmitted to the mobile communication devices 130 and 140. The second portion 360 carries 48-bit synchronization or signaling field. Synchronization information marks the location of the center of the TDMA burst 340 that is used by the mobile communication device 130 to synchronize with the TDMA frame 300 of the base station device 110. Each burst 340 has a length of 30 milliseconds but 27.5 milliseconds are used for the 264 bits content, which is sufficient to carry 60 milliseconds of compressed speech, using 216 bits payload. The common announcement channel 330 carries TDMA frame numbering, channel access indicators, low speed signaling, voice or data content designator, and the like. The TDMA frame 300 may include more than two timeslots with the length of the frame and the timeslots adjusted accordingly.

The base station device 110 is in a state of active transmission when either a voice call or a data call is being transmitted to the mobile communication device 130. When the base station device 110 is not actively transmitting, the transmitter 230 may be turned off to save energy. However, during active transmission, a digital mobile radio burst 340 is transmitted during every timeslot 310 and 320 even when there is no information to send. Particularly, the base station device 110 designates one of the first timeslot 310 and the second timeslot 320 as an active timeslot and the other of the first timeslot 310 and the second timeslot 320 as an idle timeslot. The base station device 110 transmits payload voice or data signals during the active timeslot and transmits idle information during idle timeslot. That is, the base station device 110 transmits idle information during the first portion 350 and the third portion 370 of the idle timeslot when there is no information to send. Since the transmitter 230 is operating even when there is no information to send, this results in increased power consumption and wasted energy. Accordingly, power consumption of the base station device 110 can be reduced by de-keying the transmitter 230 when there is no information to send during a timeslot 310 and 320. It should be noted that, multiple timeslots can be designated as active timeslots and/or idle timeslots when the TDMA frame 300 includes more than two timeslots. For example, in a TDMA frame 300 including N timeslots, N-1 timeslots may be designated as active timeslots and the remaining timeslot may be designated as an idle timeslot or any such combination. Power savings can be realized even in systems 100 implementing more than two timeslots when the transmitter 230 is de-keyed during the idle timeslots.

As used in examples described herein, de-key means that the base station device's 110 transmitter 230 is turned off, the base station device's 110 downlink is inactive, and the base station device's 110 uplink remains active and available to detect inbound transmissions. Re-key means that the base station device's 110 transmitter 230 is turned on, the base station device's 110 downlink is active to provide outbound transmissions. Additional information regarding de-keying and re-keying the transmitter 230 is described in U.S. Patent Publication No. 7,729,701.

Figure 4:
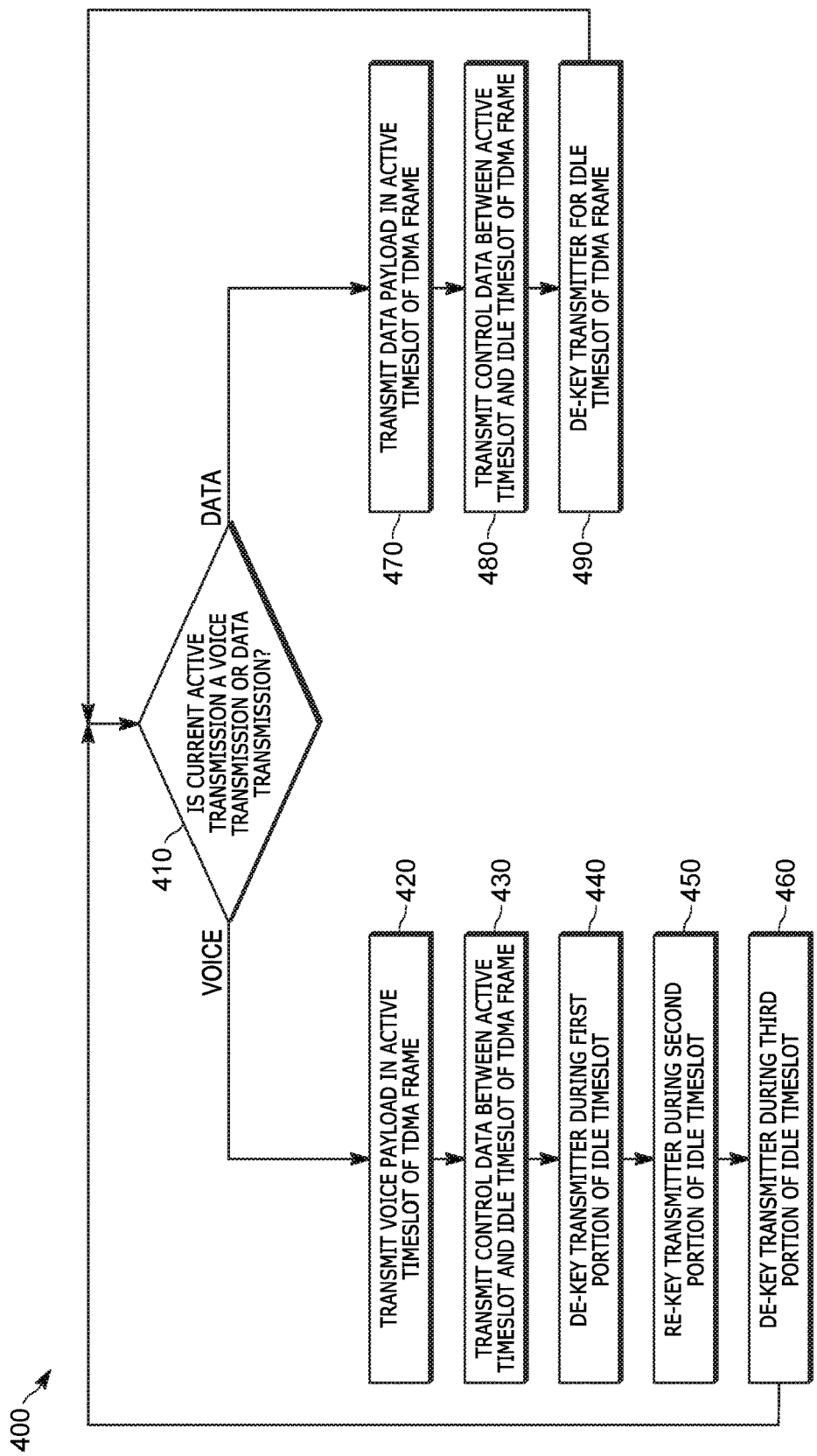
FIG. 4 is a flowchart of a method for reducing power consumption of the base station of FIG. 2 in accordance with some embodiments.

FIG. 4 illustrates a flowchart of an example method 400 for reducing power consumption of the base station device 110. During a typical voice call or data call, the transmitter 230 transmits payload (that is, voice or data signals) during the first timeslot 310, designated as the active timeslot for this example, and transmits idle signals during the second timeslot 320, designated as the idle timeslot for this example. However, it should be noted that the second timeslot 320 may be designated as the active timeslot and the first timeslot 310 may be designated as the idle timeslot. The method 400 reduces power consumption of the base station device 110 by de-keying the transmitter 230 during idle periods of an active transmission.

In the example illustrated, the method 400 includes determining, using the electronic processor 210 of the base station device 110, whether a current active transmission of the base station device 110 is a voice transmission or a data transmission (at block 410). The electronic processor 210 determines whether the transmitter 230 is transmitting a voice call or a data call to the mobile communication device 130. The electronic processor 210 may determine the nature of the call (for example, whether the call includes voice or data) based on the incoming request from the mobile communication device 130.

In response to determining that the current active transmission is the voice transmission at block 410, the method 400 includes transmitting, via the transmitter 230, voice payload in the active timeslot of the TDMA frame 300 (at block 420). As described above with respect to FIG. 3B, the electronic processor 210 controls the transmitter 230 to transmit 216 bits or 264 bits of voice payload during the first timeslot 310. In addition to the voice payload, the transmitter 230 may also transmit synchronization information (that is, 48-bits) to the mobile communication device 130. The method 400 also includes transmitting, via the transmitter 230, control data between the active timeslot and the idle timeslot of the TDMA frame 300 (at block 430). In one example, the electronic processor 210 controls the transmitter 230 to transmit control data during the common announcement channel 330 to the mobile communication device 130.

The method 400 also includes de-keying, using the electronic processor 210, the transmitter 230 during the first portion 350 of the idle timeslot (at block 440). Since the second timeslot 320 is the idle timeslot, the base station device 110 does not transmit any voice payload to the mobile communication device 130 during the second timeslot 320. Therefore, the electronic processor 210 may de-key the transmitter 230 to conserve energy of the power supply 120. The transmitter 230 does not transmit during the first portion 350 of the second timeslot 320.

The method 400 also includes re-keying, using the electronic processor 210, the transmitter 230 during the second portion 360 of the idle timeslot (at block 450). Unlike a data transmission, in which synchronization opportunities occur in every TDMA frame 300, synchronization opportunities occur only once in six TDMA frames during voice transmission. Accordingly, the base station device 110 may need to transmit synchronization signals even during an idle timeslot. The electronic processor 210 re-keys the transmitter 230 during the second portion 360 of the second timeslot 320 to transmit synchronization information to the mobile communication device 130. In some embodiments, second portion 360 of the idle timeslot may be used to send unique identification information of the idle timeslot or any other data or information instead of the synchronization information.

The method 400 also includes de-keying, using the electronic processor 210, the transmitter 230 during a third portion 370 of the idle timeslot (at block 460). As described above, since the base station device 110 does not need to transmit voice payload during the second timeslot 320, the electronic processor 210 de-keys the transmitter 230 for the third portion 370 after transmitting the synchronization information in the second portion 360 of the second timeslot 320. The electronic processor 210 may then re-key the transmitter 230 to transmit the next TDMA frame 300 after the second timeslot 320. The method 400 repeats to determine the next TDMA frame 300 or next active transmission of the base station device 110.

In response to determining, at block 410, that the current active transmission is the data transmission, the electronic processor 210 controls the transmitter 230 to transmit a data payload in the active timeslot of the TDMA frame 300 (at block 470). As described above with respect to FIG. 3B, the electronic processor 210 controls the transmitter 230 to transmit 216 bits of data payload during the first timeslot 310. In addition to the data payload, the transmitter 230 also transmits synchronization information (that is, 48-bits) to the mobile communication device 130. The method 400 also includes transmitting, using the electronic processor 210, via the transmitter 230, control data between the active timeslot and the idle timeslot of the TDMA frame 300 (at block 480). Particularly, the electronic processor 210 controls the transmitter 230 to transmit control data during the common announcement channel 330 to the mobile communication device 130.

The method 400 further includes de-keying, using the electronic processor 210, the transmitter 230 for the idle timeslot of the TDMA frame 300 (at block 490). Since the second timeslot 320 is the idle timeslot, the base station device 110 does not transmit any data payload to the mobile communication device 130 during the second timeslot 320. Additionally, since synchronization information is transmitted during every active timeslot for a data transmission, synchronization information need not be transmitted during an idle timeslot for a data transmission. Therefore, the electronic processor 210 de-keys the transmitter 230 for the entirety of the second timeslot 320 to conserve energy of the power supply 120. The transmitter 230 does not transmit during either of the first portion 350, the second portion 360, or the third portion 370 of the second timeslot 320. The method 400 then repeats to determine the next TDMA frame 300 or next active transmission of the base station device 110.

Figure 5:
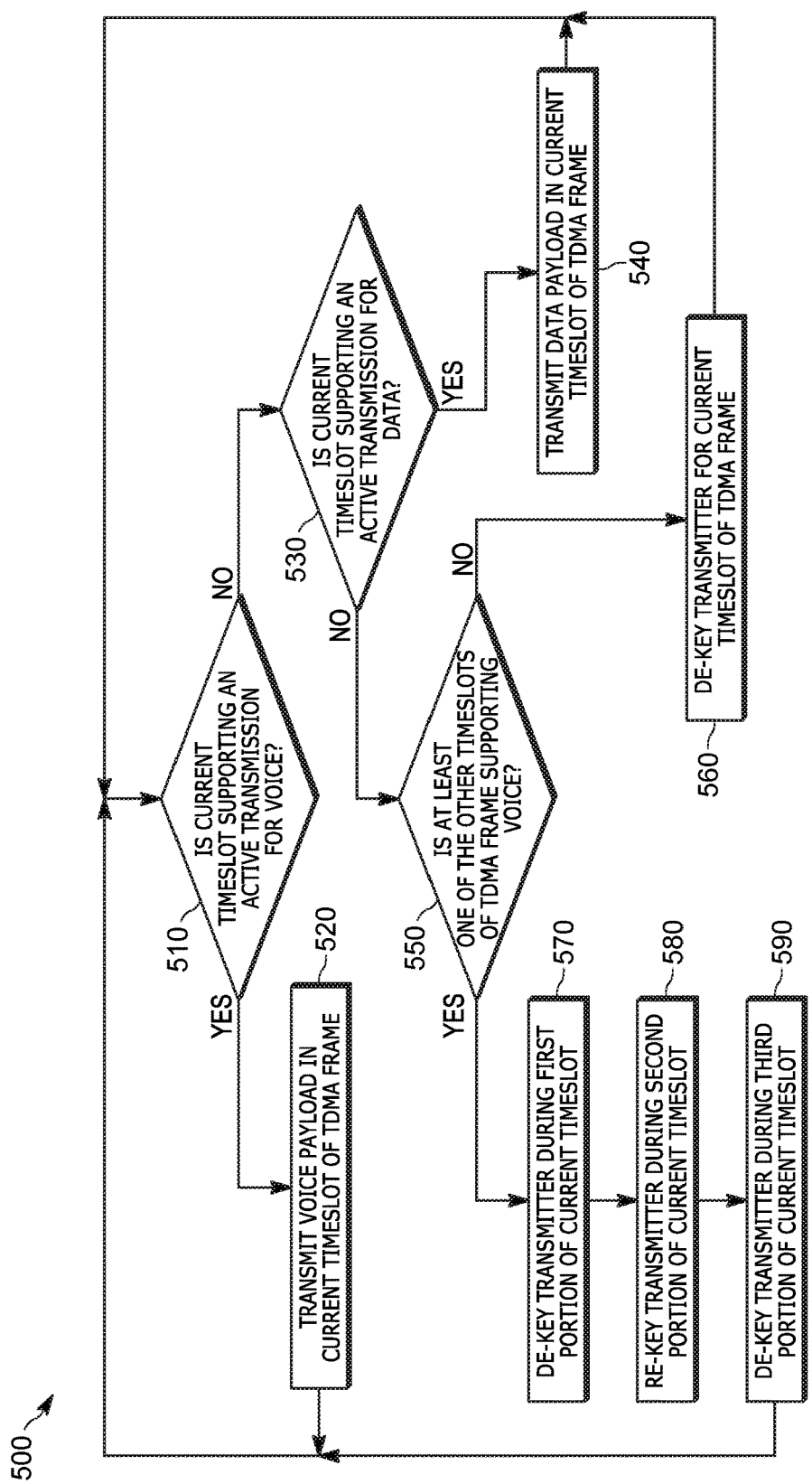
FIG. 5 is a flowchart of a method for reducing power consumption of the base station of FIG. 2 in accordance with some embodiments.

FIG. 5 illustrates a flowchart of an example method 500 for reducing power consumption of the base station device 110. The method 500 may be implemented on the digital mobile radio system 100 that transmits a TDMA frame 300 with two or more timeslots. In the example illustrated, the method 500 includes determining, using the electronic processor 210 of the base station device 110, whether a current timeslot of a TDMA frame 300 is supporting an active transmission for voice (at block 510). The electronic processor 210 determines whether the transmitter 230 is transmitting a voice call to the mobile communication device 130 in the current timeslot of the current TDMA frame 300. The electronic processor 210 may determine the nature of the call (for example, whether the call includes voice or data) based on the incoming request from the mobile communication device 130.

In response to determining that the current timeslot of the current TDMA frame 300 is supporting an active transmission for voice at block 510, the method 500 includes transmitting, via the transmitter 230, voice payload in the current timeslot of the TDMA frame 300 (at block 520). As described above with respect to FIG. 3B, the electronic processor 210 controls the transmitter 230 to transmit 216 bits or 264 bits of voice payload during the current timeslot. In addition to the voice payload, the transmitter 230 may also transmit synchronization information (that is, 48-bits) to the mobile communication device 130. The method 500 then returns to block 510 to determine the state of the next timeslot after the current timeslot whether or not the next timeslot is part of the current TDMA frame 300.

In response to determining that the current timeslot of the current TDMA frame 300 is not supporting an active transmission for voice at block 510, the method 500 includes determining, using the electronic processor 210, whether the current timeslot of the TDMA frame 300 is supporting an active transmission for data (at block 530). The electronic processor 210 determines whether the transmitter 230 is transmitting a data call to the mobile communication device 130 in the current timeslot of the current TDMA frame 300. The electronic processor 210 may determine the nature of the call (for example, whether the call includes voice or data) based on the incoming request from the mobile communication device 130.

In response to determining that the current timeslot of the current TDMA frame 300 is supporting an active transmission for data at block 530, the method 500 includes transmitting, via the transmitter 230, data payload in the current timeslot of the TDMA frame 300 (at block 540). As described above with respect to FIG. 3B, the electronic processor 210 controls the transmitter 230 to transmit 216 bits of data payload during the current timeslot. In addition to the data payload, the transmitter 230 also transmits synchronization information (that is, 48-bits) to the mobile communication device 130. The method 500 then returns to block 510 to determine the state of the next timeslot after the current timeslot whether or not the next timeslot is part of the current TDMA frame 300.

In response to determining that the current timeslot of the current TDMA frame 300 is not supporting an active transmission for data at block 530, the method 500 includes determining, using the electronic processor 210, whether at least one of the other timeslots of the TDMA frame 300 is supporting an active transmission for voice (at block 550). The electronic processor 210 determines whether the transmitter 230 has transmitted a voice payload in a previous timeslot of the TDMA frame 300 or will transmit a voice payload in a subsequent timeslot of the TDMA frame 300. The electronic processor 210 may determine the whether at least one of the other timeslots is supporting a voice payload based on stored history or based on the nature of the call being handled by the base station device 110.

In response to determining that at least one of the other timeslots of the TDMA frame 300 is not supporting an active transmission for voice, the method 500 includes de-keying, using the electronic processor 210, the transmitter 230 for the current timeslot of the TDMA frame 300 (at block 560).

As described above, when a TDMA frame 300 is not involved in active transmission of a voice call, the idle timeslot is not needed to transmit any payload or synchronization information. Additionally, since synchronization information is transmitted during every active timeslot for a data transmission, synchronization information need not be transmitted during an idle timeslot for a data transmission. Therefore, the electronic processor 210 de-keys the transmitter 230 for the entirety of the current timeslot, which is an idle timeslot to conserve energy of the power supply 120. The transmitter 230 does not transmit during either of the first portion 350, the second portion 360, or the third portion 370 of the current timeslot. The method 500 then returns to block 510 to determine the state of the next timeslot after the current timeslot whether or not the next timeslot is part of the current TDMA frame 300.

In response to determining that at least one of the other timeslots of the TDMA frame 300 is supporting an active transmission for voice, the method 500 includes de-keying, using the electronic processor 210, the transmitter 230 during the first portion 350 of the current timeslot (at block 570). Since the current timeslot is the idle timeslot, the base station device 110 does not transmit any voice payload to the mobile communication device 130 during the current timeslot. Therefore, the electronic processor 210 may de-key the transmitter 230 to conserve energy of the power supply 120. The transmitter 230 does not transmit during the first portion 350 of the current timeslot.

The method 500 also includes re-keying, using the electronic processor 210, the transmitter 230 during the second portion 360 of the current timeslot (at block 580). Unlike a data transmission, in which synchronization opportunities occur in every TDMA frame 300, synchronization opportunities occur only once in six TDMA frames during voice transmission. Accordingly, the base station device 110 may need to transmit synchronization signals even during an idle timeslot. The electronic processor 210 re-keys the transmitter 230 during the second portion 360 of the current timeslot to transmit synchronization information or other information to the mobile communication device 130.

The method 400 500 includes de-keying, using the electronic processor 210, the transmitter 230 during a third portion 370 of the current timeslot (at block 590). As described above, since the base station device 110 does not need to transmit voice payload during the second timeslot 320, the electronic processor 210 de-keys the transmitter 230 for the third portion 370 after transmitting the synchronization information or other information in the second portion 360 of the current timeslot. The method 500 then returns to block 510 to determine the state of the next timeslot after the current timeslot whether or not the next timeslot is part of the current TDMA frame 300.

In some embodiments, the electronic processor 210, for a voice transmission, de-keys the transmitter 230 during the first portion 350 of the idle timeslot (block 440), re-keys the transmitter 230 during the second portion 360 of the idle timeslot (block 450), and de-keys the transmitter 230 during the third portion 370 of the idle timeslot (block 460) in response to detecting a loss of a main power source 120. For a data transmission, the electronic processor 210, de-keys the transmitter 230 for the idle timeslot (block 490) in response to detecting a loss of a main power source 120.

In some embodiments, the electronic processor 210, for a voice transmission, de-keys the transmitter 230 during the first portion 350 of the idle timeslot (block 440), re-keys the transmitter 230 during the second portion 360 of the idle timeslot (block 450), and de-keys the transmitter 230 during the third portion 370 of the second idle timeslot (block 460) in response to detecting that the base station device 110 is being powered by a battery power source 120. For data transmission, the electronic processor 210, de-keys the transmitter 230 for the idle timeslot (block 490) in response to detecting that the base station device 110 is being powered by a battery power source 120.

In some embodiments, the electronic processor 210, for a voice transmission, de-keys the transmitter 230 during the first portion 350 of the idle timeslot (block 440), re-keys the transmitter 230 during the second portion 360 of the idle timeslot (block 450), and de-keys the transmitter 230 during the third portion 370 of the idle timeslot (block 460) in response to detecting that the charge level of the battery power source 120 of the base station device 110 is below a predetermined threshold. For data transmission, the electronic processor 210, de-keys the transmitter 230 for the idle timeslot (block 490) in response to detecting that the charge level of the battery power source 120 of the base station device 110 is below a predetermined threshold.

In some embodiments, the electronic processor 210, for a voice transmission, de-keys the transmitter 230 during the first portion 350 of the idle timeslot (block 440), re-keys the transmitter 230 during the second portion 360 of the idle timeslot (block 450), and de-keys the transmitter 230 during the third portion 370 of the idle timeslot (block 460) in response to detecting that the base station device 110 is being powered by capacity-limited alternative power source 120 (for example, solar cells, windmill, and the like that are dependent on environmental conditions for energy). For data transmission, the electronic processor 210 de-keys the transmitter 230 for the idle timeslot (block 490) in response to detecting that the base station device 110 is being powered by capacity-limited alternative power source 120.

As should be apparent from the description provided, the digital mobile radio system 100 realizes energy savings (or reduces energy consumption) by turning off the transmitter 230 during idle timeslots. In some instances, the above methods lead to 31% energy savings during voice calls and up to 41% energy savings during data calls and beacons.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ... a," "has ... a," "includes ... a," or "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A base station device with reduced power consumption, the base station device comprising:
   a transmitter configured to implement time-division multiple access (TDMA), the transmitter transmitting payload signals in a TDMA frame including a first timeslot and a second timeslot, wherein one of the first timeslot and the second timeslot is designated as an active timeslot and the other of the first timeslot and the second timeslot is designated as an idle timeslot;
   an electronic processor coupled to the transmitter and configured to control transmission of calls through the transmitter, the electronic processor configured to:
      determine whether a current active transmission of the base station device is a voice transmission or a data transmission,
      in response to determining that the current active transmission is the voice transmission:
         transmit, via the transmitter, voice payload in the active timeslot of the TDMA frame;
         transmit, via the transmitter, control data between the active timeslot and the idle timeslot of the TDMA frame;
         de-key the transmitter during a first portion of the idle timeslot;
         re-key the transmitter during a second portion of the idle timeslot; and
         de-key the transmitter during a third portion of the idle timeslot,
      in response to determining that the current active transmission is the data transmission:
         transmit, via the transmitter, data payload in the active timeslot of the TDMA frame;
         transmit, via the transmitter, control data between the active timeslot and the idle timeslot of the TDMA frame; and
         de-key the transmitter for the idle timeslot of the TDMA frame.

2. The base station device of claim 1, wherein the TDMA frame includes a common announcement channel (CACH) between the first timeslot and the second timeslot and wherein the control data is transmitted in the common announcement channel.

3. The base station device of claim 1, wherein the electronic processor is configured to de-key the transmitter during the first portion of the idle timeslot, re-key the transmitter during the second portion of the idle timeslot, and de-key the transmitter during the third portion of the idle timeslot further in response to detecting a loss of a main power source.

4. The base station device of claim 3, wherein the electronic processor is configured to de-key the transmitter for the idle timeslot further in response to detecting the loss of the main power source.

5. The base station device of claim 1, wherein the electronic processor is configured to de-key the transmitter during the first portion of the idle timeslot, re-key the transmitter during the second portion of the idle timeslot, and de-key the transmitter during the third portion of the idle timeslot further in response to detecting that the base station device is being powered by a battery power source.

6. The base station device of claim 5, wherein the electronic processor is configured to de-key the transmitter for the idle timeslot further in response to detecting that the base station device is being powered by the battery power source.

7. The base station device of claim 1, wherein the electronic processor is configured to de-key the transmitter during the first portion of the idle timeslot, re-key the transmitter during the second portion of the idle timeslot, and de-key the transmitter during the third portion of the idle timeslot further in response to detecting that a charge level of a battery power source of the base station device is below a predetermined threshold.

8. The base station device of claim 7, wherein the electronic processor is configured to de-key the transmitter for the idle timeslot further in response to detecting that the charge level of the battery power source is below the predetermined threshold.

9. The base station device of claim 1, wherein when the transmitter is re-keyed during the second portion of the idle timeslot, the electronic processor is further configured to transmit, via the transmitter, sync information during the second portion of the idle timeslot.

10. The base station device of claim 1, wherein when the transmitter is re-keyed during the second portion of the idle timeslot, the electronic processor is further configured to transmit, via the transmitter, unique identification information of the idle timeslot during the second timeslot of the idle timeslot.

11. A method for reducing power consumption of a base station device, the base station device including a transmitter configured to implement time-division multiple access (TDMA), the transmitter transmitting payload signals in a TDMA frame including a first timeslot and a second timeslot, wherein one of the first timeslot and the second timeslot is designated as an active timeslot and the other of the first timeslot and the second timeslot is designated as an idle timeslot the method comprising:
   determining, using an electronic processor of the base station device, whether a current active transmission of the base station device is a voice transmission or a data transmission,
   in response to determining that the current active transmission is the voice transmission:
      transmitting, via the transmitter, voice payload in the active timeslot of the TDMA frame;
      transmitting, via the transmitter, control data between the active timeslot and the idle timeslot of the TDMA frame;
      de-keying, using the electronic processor, the transmitter during a first portion of the idle timeslot;
      re-keying, using the electronic processor, the transmitter during a second portion of the idle timeslot and transmit, via the transmitter, sync information; and
      de-keying, using the electronic processor the transmitter during a third portion of the idle timeslot,
   in response to determining that the current active transmission is the data transmission:
      transmitting, via the transmitter, data payload in the active timeslot of the TDMA frame;
      transmitting, via the transmitter, control data between the active timeslot and the idle timeslot of the TDMA frame; and
      de-keying, using the electronic processor, the transmitter for the idle timeslot of the TDMA frame.

12. The method of claim 11, wherein the TDMA frame includes a common announcement channel (CACH) between the first timeslot and the second timeslot and wherein the control data is transmitted in the common announcement channel.

13. The method of claim 11, wherein de-keying the transmitter during the first portion of the idle timeslot, re-keying the transmitter during the second portion of the idle timeslot, and de-keying the transmitter during the third portion of the idle timeslot is performed further in response to detecting a loss of a main power source.

14. The method of claim 13, wherein de-keying the transmitter for the idle timeslot is performed further in response to detecting the loss of the main power source.

15. The method of claim 11, wherein de-keying the transmitter during the first portion of the idle timeslot, re-keying the transmitter during the second portion of the idle timeslot, and de-keying the transmitter during the third portion of the idle timeslot is performed further in response to detecting that the base station device is being powered by a battery power source.

16. The method of claim 15, wherein de-keying the transmitter for the idle timeslot is performed further in response to detecting that the base station device is being powered by the battery power source.

17. The method of claim 11, wherein de-keying the transmitter during the first portion of the idle timeslot, re-keying the transmitter during the second portion of the idle timeslot, and de-keying the transmitter during the third portion of the idle timeslot is performed further in response to detecting that a charge level of a battery power source of the base station device is below a predetermined threshold.

18. The method of claim 17, wherein de-keying the transmitter for the idle timeslot is performed further in response to detecting that the charge level of the battery power source is below the predetermined threshold.

19. The method of claim 11, wherein when the transmitter is re-keyed during the second portion of the idle timeslot, the electronic processor is further configured to transmit, via the transmitter, sync information during the second portion of the idle timeslot.

20. The method of claim 11, wherein when the transmitter is re-keyed during the second portion of the idle timeslot, the electronic processor is further configured to transmit, via the transmitter, unique identification information of the idle timeslot during the second portion of the idle timeslot.

* * * * *